United States Patent
Clark, II

(10) Patent No.: US 6,199,578 B1
(45) Date of Patent: Mar. 13, 2001

(54) DEVICE FOR DRAINING FLUID FROM A CONTAINER

(75) Inventor: James E. Clark, II, Ojai, CA (US)

(73) Assignee: C.H. & I. Technologies, Inc., Santa Paula, CA (US)

( * ) Notice: Subject to any disclaimer, the term of this patent is extended or adjusted under 35 U.S.C. 154(b) by 0 days.

(21) Appl. No.: 09/077,588

(22) PCT Filed: Dec. 1, 1995

(86) PCT No.: PCT/US95/15684

§ 371 Date: May 18, 1999

§ 102(e) Date: May 18, 1999

(87) PCT Pub. No.: WO97/21023

PCT Pub. Date: Jun. 12, 1997

(51) Int. Cl.[7] ............ F01M 11/04; F16K 24/02; F16K 43/00

(52) U.S. Cl. ............ 137/318; 123/196 R; 123/196 A; 137/322; 137/614.04; 141/65; 141/98; 141/330; 141/346; 184/1.5; 210/248; 210/416.5; 222/91; 222/559; 251/149.5; 408/67; 408/224; 408/226

(58) Field of Search ............ 7/100, 142, 158, 7/170; 81/3.08, 3.2, 3.45; 123/196 R, 196 A, 196 S; 141/65, 98, 329, 330, 346, 383; 210/248, 416.5; 184/1.5; 222/91, 544, 559; 251/149.5; 408/67, 224, 226; 137/317, 318, 322, 544, 547, 549, 550, 614.04

(56) References Cited

U.S. PATENT DOCUMENTS

| | | |
|---|---|---|
| 552,408 | 12/1895 | Barnes . |
| 1,248,251 | 11/1917 | Breaux . |
| 1,818,122 | 8/1931 | Engbrecht . |
| 2,184,263 | 12/1939 | Adler ........................... 221/23 |
| 2,314,013 | * 3/1943 | Mueller et al. .............. 137/318 |
| 2,767,600 | * 10/1956 | Mueller et al. .............. 137/318 |
| 3,072,138 | 1/1963 | Fabian et al. ................ 137/318 |
| 3,509,905 | 5/1970 | Mullins ....................... 137/318 |
| 3,817,302 | 6/1974 | Kowal et al. ................ 141/383 |
| 4,046,013 | * 9/1977 | Green ........................... 137/318 |
| 4,071,012 | 1/1978 | Cooke .......................... 137/321 |
| 4,177,529 | 12/1979 | Sikula, Jr. ....................... 7/100 |
| 4,269,237 | 5/1981 | Berger ......................... 141/346 |
| 4,672,932 | 6/1987 | Schmidt ....................... 123/196 |
| 4,676,281 | 6/1987 | Nord ................................ 141/1 |
| 4,680,848 | * 7/1987 | Goldner ....................... 137/318 |
| 4,776,431 | 10/1988 | Poling .......................... 184/1.5 |
| 4,865,156 | 9/1989 | Poling .......................... 184/1.5 |
| 4,948,503 | 8/1990 | Baumann et al. ............ 210/232 |
| 5,030,039 | * 7/1991 | Dove ............................ 137/318 |
| 5,070,831 | 12/1991 | Yunick ......................... 123/196 |
| 5,074,379 | 12/1991 | Batrice ......................... 184/1.5 |
| 5,154,775 | 10/1992 | Bedi ............................. 134/22.1 |
| 5,299,714 | 4/1994 | Kilgore .......................... 222/81 |
| 5,396,814 | * 3/1995 | Tuttle et al. .................. 73/866.5 |
| 5,546,979 | * 8/1996 | Clark, II et al. ............. 137/318 |
| 5,558,140 | * 9/1996 | Clark, II ....................... 184/1.5 |
| 5,704,383 | * 1/1998 | Kammeraad et al. ........ 137/318 |

* cited by examiner

Primary Examiner—George L. Walton
(74) Attorney, Agent, or Firm—Christie, Parker & Hale, LLP

(57) ABSTRACT

A fluid container draining device (10) for use in draining a fluid container, such as an oil filter (12) in a controlled manner. It has a drill bit (14) with a sharpened tip (16) and exterior channels (20) on its shaft (18) extending from its tip (16) to a rear region (22). The drill bit (14) is immobilized in an axial bore (3) of a drill bit holder (24) which has a threaded front region (26) which is preferably frustum-shaped. Located rearwardly of the drill bit holder (24) is a valve (42) which when opened up permits fluid to be drained from the fluid container (12) through the channels (20) on the drill bit's shank (18), through the axial bore (30) in the drill bit holder (24), and out through the valve (42).

18 Claims, 5 Drawing Sheets

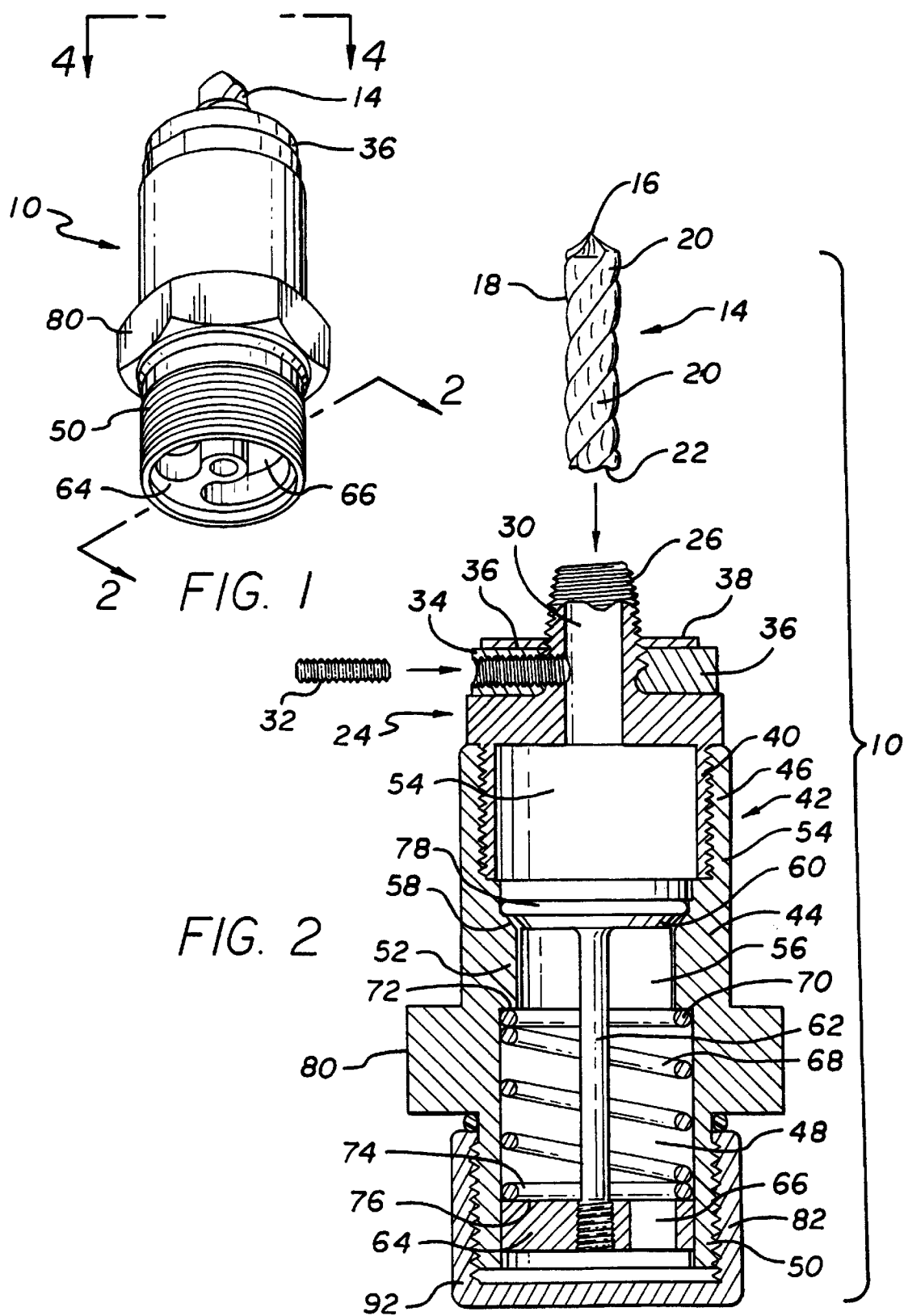

DEVICE FOR DRAINING FLUID FROM A CONTAINER

BACKGROUND OF THE INVENTION

1. Field of the Invention

This invention relates to the field of removing fluid from containers, and more particularly to a tool for insertion into the wall of a container with fluid, i.e. an oil filter, to permit the fluid to be evacuated therefrom, before the filter is removed from the motor or machinery, to avoid leakage of the fluid from the filter.

2. Description of the Prior Art

Lubrication systems in machinery, aircraft and vehicles require that their lubricants, viz., oil, and oil filters be replaced periodically in order to maintain the good working order of the engine and machinery. For passe nger automobiles, many mechanics recommend a oil and filter change every 3,000 miles of travel to maintain maximum engine life. Professional truckers put thousands of miles on their trucks every week and wait many, many hours for oil changes over the course of a year.

Replacing the oil in a motor vehicle typically involves placing a large oil drain basin under the oil pan, removing the drain plug, thereby allowing the oil to drain therein, and unscrewing the oil filter from the engine block. Due to the engine designs of most engines, it has been difficult to remove oil filters without spilling oil onto the frame of the vehicle, on the mechanics and/or the ground. This is not only messy, but is environmentally unsound. Since many oil changes are conducted when the oil is very hot, this also poses a safety hazard to mechanics.

Attempts have been made to overcome these problems in changing oil filters. U.S. Pat. No. 4,177,529 to Sikula, Jr. discloses an oil filter draining wrench which has a cylindrical housing with a center punch for punching and draining oil from an oil filter. The filter wrench is hammered onto the filter. A rubber gasket at the open end of the cylindrical housing sealingly engages the outside of the oil filter, and prevents oil from leaking out around the punch. An oil drain outlet is used to drain the oil from the housing which collects it. In the tight engine compartments of modern motor vehicles, there is rarely enough space to place such a housing over the oil filter much less to swing a hammer.

U.S. Pat. Nos. 4,776,431 and 4,865,156 to Poling disclose oil change devices and methods which utilize punches and vacuum chambers. The vacuum chambers are attached by suction to the oil filter, and the punches are driven into the filter's sidewalls, penetrating the filter. The oil will thus be evacuated out of the filter, through the vacuum chamber, and out the evacuation tube. The Poling devices unduly rely on the vacuum seal thus established, and these devices would not be expected to operate reliably.

U.S. Pat. No. 5,299,714 to Kilgore discloses what is said to be a self-sealing oil filter punch, which is driven into the metal housing of an oil filter, so the oil can be drained through the hollow center of the punch and out the oil filter. The sharp tip of the punch is pushed through the bottom of the oil filter, and the punch has a resilient washer for sealing the punch against the oil filter's housing. A spigot valve is located on the end of the Kilgore device to control the oil flow through the punch. The Kilgore oil filter punch lacks means to positively engage the oil filter punch in fluid tight contact with the oil filter's housing, and jarring of the punch would be expected to unseat the seal. Moreover, if the spigot valve handle is advertently turned at an inopportune time, oil will spill out of the filter.

U.S. Pat. No. 1,248,251 to Breaux discloses a hollow faucet which is bored into a barrel to gain access to its contents. The faucet has an auger at its tip for drilling into the barrel, which transitions into a smooth, widening tapered shaft which is driven into the barrel to provide frictional sealing engagement with walls of the barrel. The faucet has a central bore for passage of the fluid to be drained. While the Breaux device may be acceptable for wood barrels, it would not be expected to function in the case of metal container, such as thin, metal-walled oil filters.

The oil drain tools of the instant inventor's prior filed U.S. patent application Ser. No. 08/300,402 entitled "Device For Draining Of Fluid From A Container," filed Sep. 2, 1994, and inventor's and co-inventor Poul Van Santen's U.S. continuation-in-part patent application Ser. No. 08/384,946, entitled "Improved Device For Draining Fluid From A Container," filed on Feb. 7, 1995, solve most of the problems inherent with the prior art. The inventor herein has found that the tips of his prior drain tools are expensive to manufacture and maintain, and are subject to occasional clogging.

There accordingly remains a need for a filter draining fitting which is not only easy to use, simple in design, inexpensive to manufacture and which provides for leak proof operation, but which is designed to last a long term at a low cost.

BRIEF SUMMARY OF THE INVENTION

The invention provides a fluid container draining device which allows fluid to be removed from a fluid container in a controlled manner, said fluid container having walls defining a fluid filled interior region therebetween, said fluid container draining device comprising:

a twist drill bit means having a sharpened tip and a shank with exterior channels formed thereon, and extending to said tip;

a drill bit holding means comprising a front region and a rear region, said front region being male threaded, with an axial bore formed therethrough which communicates with said rear region of said drill bit holder means, said axial bore being sized to receive said twist drill bit means;

a means to selectively immobilize said twist drill bit means in said axial bore such that the sharpened tip of the drill bit means extends forwardly of said front region of the drill bit holding means; and a fluid valve means positioned at said rear region of said drill bit holding means and in fluid thereof, said fluid valve means providing fluid flow control between the interior of the fluid container and the outside of the fluid container, wherein in use of said fluid container draining device said twist drill bit means is adapted to cut into and penetrate the walls of the fluid container and the male threaded front region of the drill bit holding means is adapted to screw into the walls of the fluid container.

The invention further provides a fluid container draining device which allows fluid to be removed from a fluid container with walls in a controlled manner, said fluid container having walls defining a fluid filled interior region therebetween, said fluid container draining device comprising:

an elongate twist drill bit having a sharpened tip and a shank with spiral channels formed thereon which extend from said tip to a rear region;

a drill bit holding means comprising a front region and a rear region, said front region being conical and male threaded, with an axial bore formed therethrough, said axial bore being sized to receive said twist drill bit, said rear region being externally threaded;

a means to securely yet replaceably receive said twist drill bit in said holding means; and a fluid valve means positioned at said rear region of said drill bit holding means in fluid connection thereof, said fluid valve means providing fluid flow control between the interior of the fluid container and the outside of the fluid container, said fluid valve means having an internally threaded front region which screws into the externally threaded rear region of the screw means, an externally threaded rear region, onto which a fluid evacuation line is attached, and a turning region, used to drill the device into wall of the fluid container, wherein in the use of the device, the twist drill bit is adapted to cut into and penetrate the walls of the fluid container and the male threaded conical front region of the drill bit holding means is adapted to screw into and fluid-tightly seal with the wall of the fluid container.

BRIEF DESCRIPTION OF THE DRAWINGS

FIG. 1 is a perspective side view of the device for draining fluid from a container;

FIG. 2 is an exploded, cross-sectional view of the device through view lines 2—2 of FIG. 1, with the drill bit and set screw shown in a removed position.

DETAILED DESCRIPTION OF THE DRAWINGS

Figure 4:
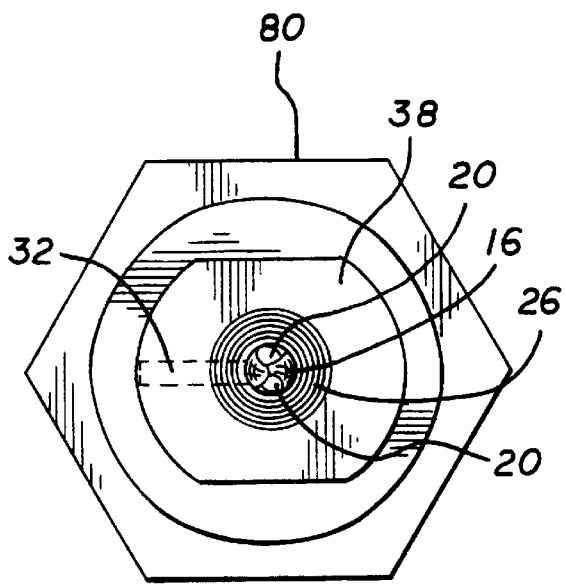
FIG. 4 is a top perspective view of device through view lines 4—4 of FIG. 1.
Figure 3:
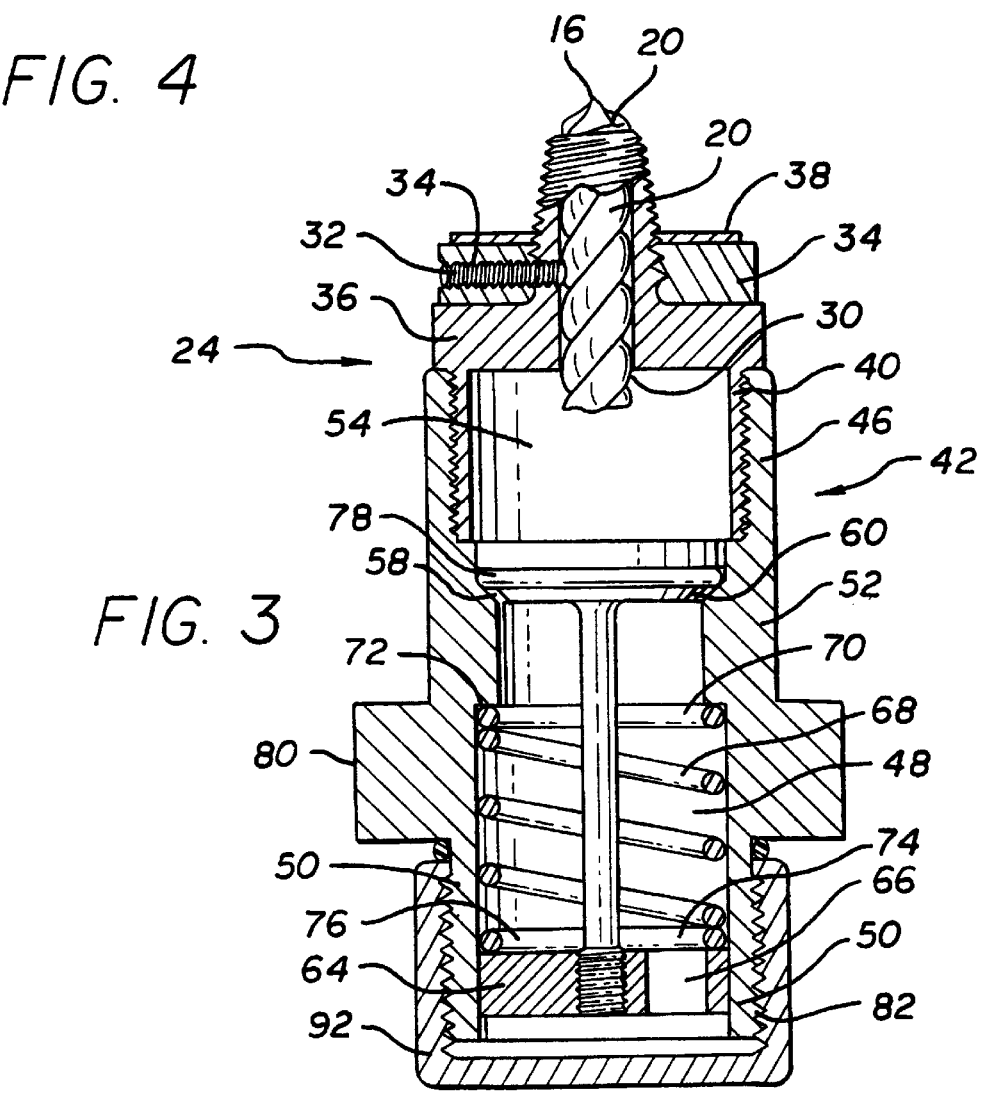
FIG. 3 is a partially exposed view of the device with its drill bit and set screw placed in the drill bit holder.

Referring to FIGS. 1 and 3, the device 10 for drawing fluid from a fluid container 12 is shown. In this figure, as well as the other figures described below, the container 12 is an oil filter, such as used for filtering the lubricants for motors and machinery. The device 10 of the invention can also be used to drain any number of containers, such as drums, cans, filters or pipes, of any number of fluids, e.g. lubricants, coolants, inks, and other chemicals.

Referring to FIG. 2, the device 10 includes a twist drill bit 14 with a sharpened cutting tip 16 and shank 18 with channels 20 formed spirally thereon. The channels 20 extend from the tip 16 rearwardly to end 22 of the shank 18.

A twist drill bit holder 24 has a front region 26 which is preferably generally frustum-shaped, and exteriorly threaded to define an "Acme-type" expanded thread. The frustum-shaped threaded front region 26 is useful in that it contributes to a positive seal with the wall of the fluid container 12, but is not absolutely required, as a front threaded region having straight sides will also function. An axial bore 30 is formed through the twist drill bit holder 24 and is sized to receive the shank 18 of the drill bit 14. In order to immobilize the drill bit 14 in the axial bore 30 of the holder 24, a set screw 32 is threaded into a threaded channel 34 passing through a collar region (or "radially extending abutment surface") 36 located rearwardly of the threaded frustum front region 26, to intersect and impinge on the twist drill bit's shank 18 placed in the axial bore 30, as best shown in FIG. 3. Other means can be used to immobilize the drill bit 14 in the holder 24 to allow for its replaceability when its tip 16 eventually becomes dull after repeated use. The collar 36 acts as a radially extending abutment surface which will seat on fluid container 12 to be drained. If desired, a sealing gasket or washer 38 can be placed on the collar 36 and will act to further enhance the seal formed with the fluid container 12. Located rearwardly of the front region 26 is a rearwardly male threaded portion 40.

A valve 42 is positioned behind the drill bit holder 24 and has a valve body 44 which has a female threaded front end 46, into which the male threaded rear portion 40 of the drill bit holder 24 screws into liquid tightly.

Figure 5:
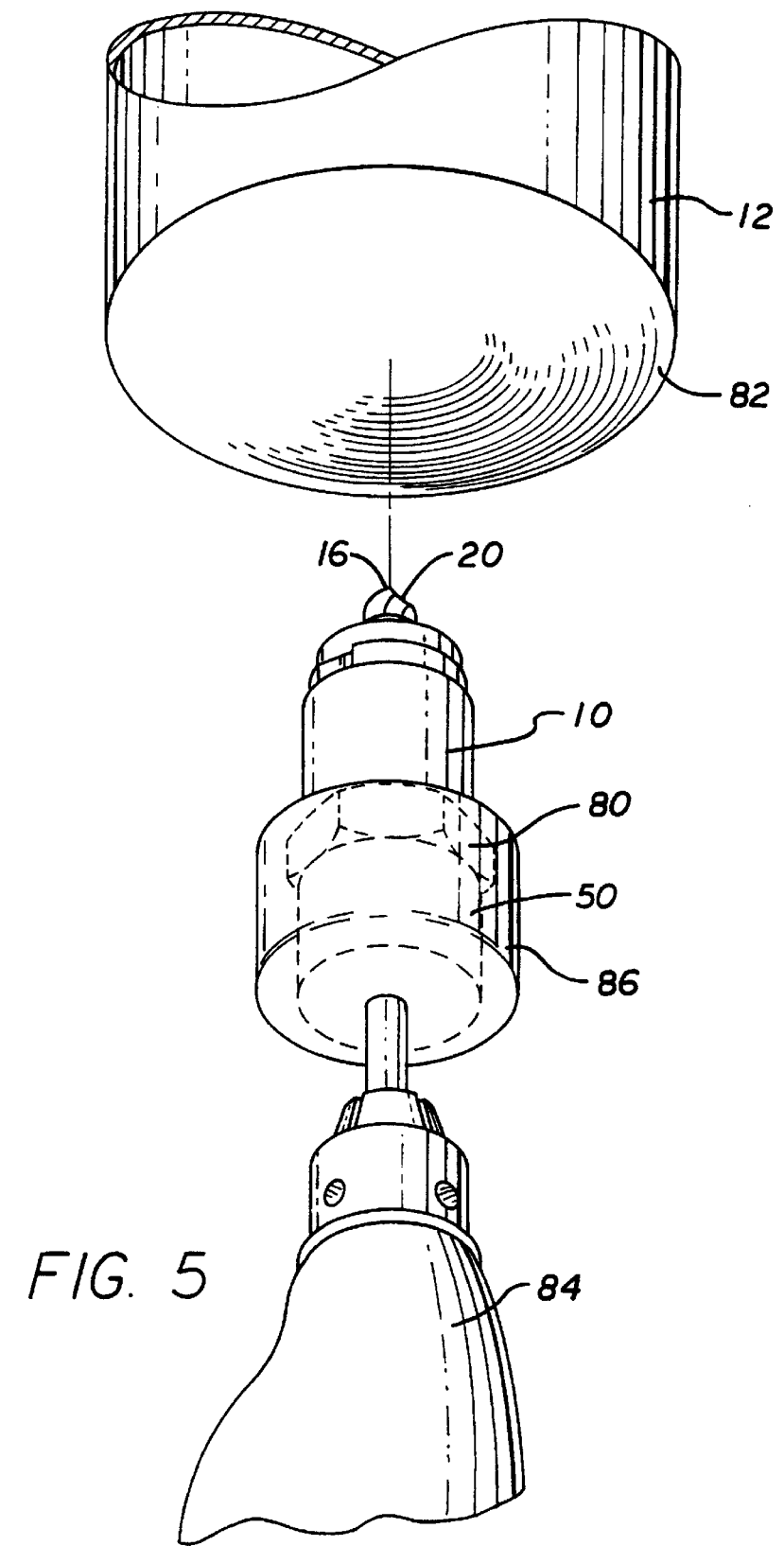
FIG. 5 is a perspective view of the device being drilled into the wall of fluid container.

A longitudinal bore 48 is formed through the rear end 50 of the valve body 44, and terminates at a inner wall 52 located behind the female threaded front end 54 of the valve body 44. A passage channel 56 passes through the inner wall 52. A forward face of the inner wall 52 closest to the front of the valve portion 42 has a seating surface 58. A valve head 60 is sized to seat on the seating surface 58. The valve head 60 has a valve shaft 62 extending rearwardly through the passage channel 56 and through the longitudinal bore 48, and is connected to a pushing portion 64, which normally sits near the rear end 50 of the valve body 44. The pushing portion 64 has a opening 66 formed therethrough to permit fluid to flow therethrough, and the pushing portion 64 is sized to slide in the longitudinal bore 48. A biasing coil spring 68 is placed in the longitudinal bore 48 with its front end 70 contacting a rear face 72 of the inner wall 52 and with its rear end 74 contacting the inner side 76 of the pushing portion 64. This biasing coil spring 68 will thus bias the valve head 60 into sealing contact with the seating surface 58, and thus prevents the passage of any fluid through the passage channel 56. To provide for better sealing between the valve head 60 and the seating surface 58, an O-ring 78 is preferably placed on the valve head 60. A hex turning area 80 is located on the valve body 44, in front of a male threaded 82 rear end 50 of the valve body 44. As best shown in FIG. 5, the device 10 is screwed into the wall 82 of the fluid container 12 by a drill 84 with a socket wrench 86 which fits over the rear end 50 and on the hex turning area 80.

Figure 6:
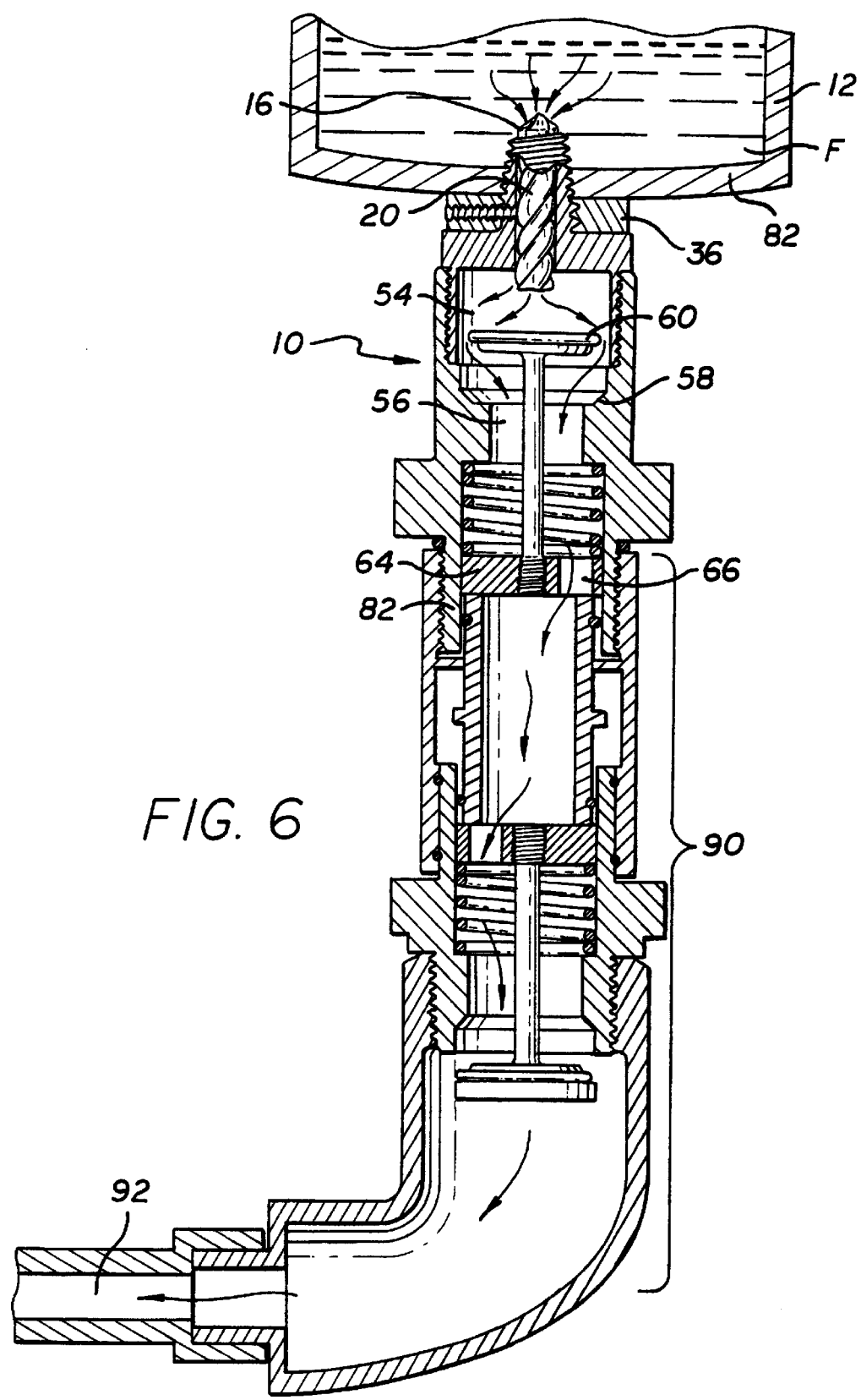
FIG. 6 is a partially exposed top view of the embodiment of FIG. 5, with the socket of a drill removed, and with its oil valve connected to a valve coupler and fluid transfer line, to evacuate fluid from the fluid container.

Referring to FIGS. 5 and 6, as the device 10 is screwed through the wall 80 and into the fluid container 12, its cutting and drilling tip 16 cuts its way through the wall 82, and then the front, Acme screw portion 26 will screw into the wall 80, forming a liquid tight seal. When the collar portion 36 contacts the wall 80 of the fluid container 12, it tends to drawn in the metal of the wall 80 into tighter contact with the Acme threaded portion 36 and collar portion 36, and further prevents the tool 10 from punching in the wall 82 of the container 12.

FIG. 6 shows the device 10 engaged on a container 12—here an oil filter, and with a valve actuating coupler 90 attached to it. When the valve actuating coupler 90 is screwed onto the male threaded rear end 82 of the valve body 44, it pushes the pushing portion 64 and thus unseats the valve head 60 from the seating surface 58, and opens up the passage channel 56 for fluid flow. A vacuum line 92 is connected to the valve actuating coupler 90. When vacuum is applied, fluid "F" is thereby evacuated from the container 12, through the channels 20 on the twist drill bit 14, the now open passage channel 56, the valve actuating coupler 90, and out through the vacuum line 92. The valve activating coupler 90 is the subject of a U.S. patent application Ser. No. 08/384,947 by James E. Clark and Poul Van Santen, filed Feb. 7, 1995 entitled, "LEAKPROOF DUAL ACTION FLUID TRANSFER VALVE."

After the fluid "F" is completely withdrawn from the fluid container 12, the coupler 90 and its vacuum line 92 are disconnected from the device 10. In cases where the container 12 is an oil filter, it can be unscrewed with the device 10 still screwed in, or the device 10 can be removed prior to removing the oil filter 12. As the coupler 90 is unscrewed from the device 10, the valve head 60 reseats on the seating surface 58, to thereby block the passage channel 56, so no more fluid can escape. Referring to FIGS. 2 and 3, if desired, a cap 94 can be screwed onto the male threaded rear end 82 of the valve body 44 while the device 10 is being screwed into the fluid container 12.

Figure 7:
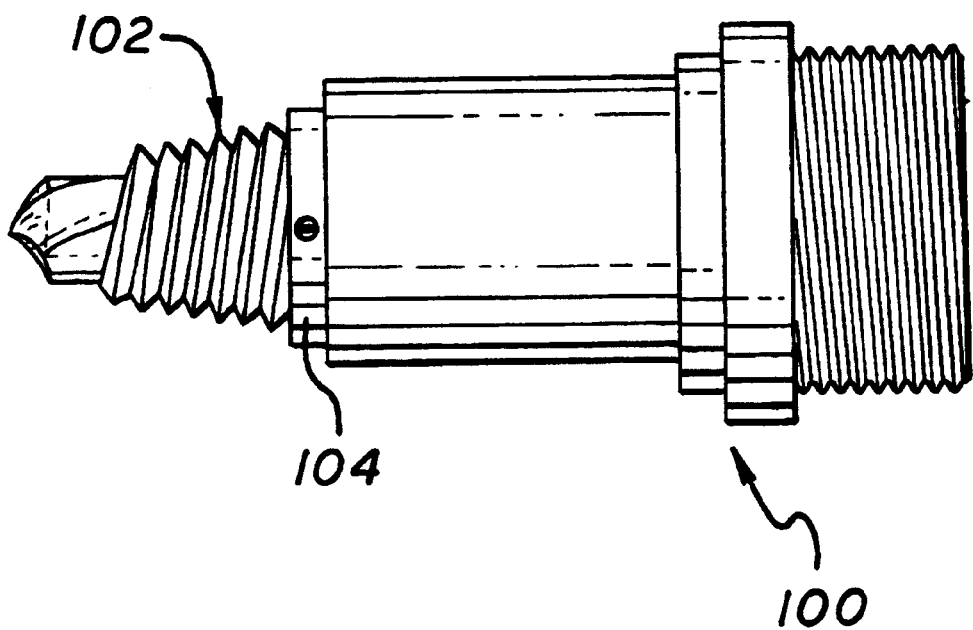
FIG. 7 is a partially exposed side view of the device, with left hand expanding threads.

Referring to FIG. 7, an alternate embodiment of the device 100 is shown, wherein the front threaded region 102 has left handed threads (threads typically being right handed). The advantage of having left hand expanding threads is that the device 100 may be screwed into the oil filter 12 by reversing the drill. The fluid is then drained. After draining, the device loo is screwed in further, further drilling and tightening the device 100 against the oil filter 12, which will at a point cause the oil filter to be unscrewed from the engine block. Thus, the device loo can be used not only to drain oil, but also as a tool to unscrew the oil filter.

This embodiment 100 thus also provides a convenient way for the oil filter 12 to be removed from engine block, without requiring an separate clamp from being placed on the oil filter. The expanding thread 102 forms a good seal with the oil filter 12, even if it is not screwed all the way in 50 that its sealing seat 104 contacts the wall of the oil filter 12. In other respect, the left handed thread oil filter.

The above described device 10 and 100 provides an easy, fast, and clean device to drain fluid from a fluid containing vessel, such as oil filters, before the oil filter is removed from the vehicle or machine.

The drawings and the foregoing description are not intended to represent the only form of the invention in regard to the details of its construction and manner of operation. In fact, it will be evident to one skilled in the art that modifications and variations may be made without departing from the spirit and scope of the invention. Changes in form and in the proportion of parts, as well as the substitution of equivalents, are contemplated as circumstances may suggest or render expedient; and although specific terms have been employed, they are intended in a generic and descriptive sense only and not for purpose of limitation, the scope of the invention being delineated in the following claims:

I claim:

1. A fluid container draining device which allows fluid to be removed from a fluid container in a controlled manner, said fluid container having walls defining a fluid filled interior region therebetween, said fluid container draining device comprising:

a removable twist drill bit means having a sharpened tip and a shank with exterior channels formed thereon, and extending to a said tip;

a drill bit holding means comprising a front region and a rear region, said front region being male threaded and adapted to sealingly engage an exterior portion of one of the walls of said container, the front region having an axial bore formed therethrough which communicates with said rear region of said drill bit holder means, said axial bore being sized to receive said twist drill bit means;

a means to selectively immobilize said twist drill bit means in said axial bore through said front sealing region such that the sharpened tip of the drill bit means can be extended variably forward of said front region of the drill bit holding means; and a fluid valve means positioned at said rear region of said drill bit holding means and in fluid communication with said fluid container, said fluid valve means providing fluid flow control between the interior of the fluid container and the rear region as fluid flows along said exterior channels, wherein rotation of said fluid container draining device causes said twist drill bit means to rotate and cut into and penetrate the walls of the fluid container and simultaneously causes the male threaded front region of the drill bit holding means to be screwed into the walls of the fluid container, thereby permitting the front region to effectively seal against one of said container walls to prevent leakage therefrom.

2. The fluid container draining device of claim 1, wherein said drill bit holder means further comprises a radially extending abutment surface located rearwardly of the threaded front region, wherein when said abutment surface is adapted tightly abut against the wall of the fluid container when said fluid container draining device is screwed in, providing improved sealing.

3. The fluid container draining device of claim 1, wherein said threaded front region is frustum-shaped.

4. The fluid container draining device of claim 1, wherein said threads are right-hand threads.

5. The fluid container draining device of claim 1, wherein said threads are left-hand threads.

6. The fluid container draining device of claim 1, wherein said rear region of said drill holder means is externally threaded and a front region of said fluid valve means is internally threaded, for attachment together.

7. The fluid container draining device of claim 1, wherein said means to selectively immobilize said twist drill bit means in said longitudinal bore comprises a set screw screwed into a threaded channel in said drill bit holder means which impinges on said twist drill bit means.

8. The fluid container draining device of claim 1, wherein said twist drill bit means comprises a replaceable twist drill bit with two channels formed thereon to provide for egress of fluid from the fluid container.

9. The fluid container draining device of claim 1, wherein said fluid valve means is provided with a fitting for connection to a suction line to thereby permit fluid to be evacuated from the fluid container.

10. The fluid container draining device of claim 1, wherein the fluid container is an oil filter for a motor.

11. The fluid container draining device of claim 1, wherein the fluid valve means comprises a valve which opens up when it is coupled with a complementary fitting on a drain line, and which otherwise remains closed.

12. A fluid container draining device which allows fluid to be removed from a fluid container with walls in a controlled manner, said fluid container having walls defining a fluid filled interior region therebetween, said fluid container draining device comprising:

a removable elongate twist drill bit having a sharpened tip and a shank with spiral channels formed thereon which extend from said tip to a rear region;

a drill bit holding means comprising a front region and a rear region, said front region being frustum-shaped and male threaded and adapted to sealingly engage an exterior portion of one of the walls of said container, the front region having an axial bore formed therethrough, said axial bore being sized to receive said twist drill bit, said rear region being externally threaded;

a means to securely yet replaceably receive said twist drill bit through said axial bore in said front sealing region in said holding means; and a fluid valve means positioned at said rear region of drill bit holding means in fluid communication with said fluid container, said fluid valve means providing fluid flow control between the interior of the fluid container and the rear region as fluid flows alone said exterior channels, said fluid valve means hating an internally threaded front region which screws into the externally threaded rear region of the screw means, an externally threaded rear region, onto which a fluid evacuation line is attached, and a turning region, used to drill the device into a wall of the fluid container, wherein rotation of the device causes the twist drill bit to rotate and cut into and penetrate the walls of the fluid container and simultaneously causes the male threaded frustum-shared front region of the drill bit holding means to be screwed into and fluid-tightly seal with the walls of the fluid containers thereby permitting the front region to effectively seal against the container walls to prevent leakage.

13. The fluid container draining device of claim 12, wherein said fluid valve means is adapted to fit a coupler connection to a suction line to thereby permit fluid to be evacuated from the fluid container.

14. The fluid container draining device of claim 12, wherein said means to selectively immobilize said twist drill bit in said longitudinal bore comprises a set screw screwed into a threaded channel in said drill bit holder means which impinges on said twist drill bit.

15. The fluid container draining device of claim 12, wherein the fluid container is an oil filter for a motor vehicle.

16. The fluid container draining device of claim 12, wherein the fluid valve means comprises a valve which is only opens up when it is coupled with a complementary fitting on a drain line, and which otherwise remains closed.

17. The fluid container draining device of claim 12, wherein said male threads on said drill bit holding means are right-hand threaded.

18. The fluid container draining device of claim 12, wherein said male threads on said drill bit holding means are left-hand threaded.

* * * * *

UNITED STATES PATENT AND TRADEMARK OFFICE
CERTIFICATE OF CORRECTION

PATENT NO.    : 6,199,578 B1
DATED         : March 13, 2001
INVENTOR(S)   : James E. Clark, II It is certified that error appears in the above-identified patent and that said Letters Patent is hereby corrected as shown below:

Column 5,
Line 59, after "extending to" delete "a".

Column 7,
Line 11, replace "alone" with -- along --.
Line 12, replace "hating" with -- having --.
Lines 20-21, replace "frustum-shared" with -- frustum-shaped --.

Signed and Sealed this

Twenty-fourth Day of September, 2002

Attest:

Attesting Officer

JAMES E. ROGAN
Director of the United States Patent and Trademark Office